United States Patent
De Mazière

(10) Patent No.: US 7,350,635 B2
(45) Date of Patent: Apr. 1, 2008

(54) HYDRAULIC DOUBLE CLUTCH

(75) Inventor: Filip De Mazière, Heusden-Destelbergen (BE)

(73) Assignee: Hoerbiger Antribstechnik GmbH, Schongau (DE)

( * ) Notice: Subject to any disclaimer, the term of this patent is extended or adjusted under 35 U.S.C. 154(b) by 148 days.

(21) Appl. No.: 11/212,473

(22) Filed: Aug. 25, 2005

(65) Prior Publication Data

US 2006/0042909 A1 Mar. 2, 2006

(30) Foreign Application Priority Data

Aug. 26, 2004 (EP) ................... 04020300

(51) Int. Cl.
*F16D 25/12* (2006.01)

(52) U.S. Cl. ................... 192/87.15; 192/106 F
(58) Field of Classification Search ............ 192/106 F, 192/87.15
See application file for complete search history.

(56) References Cited

U.S. PATENT DOCUMENTS

| | | | |
|---|---|---|---|
| 2,534,034 A | 12/1950 | Brie | |
| 3,063,529 A | 11/1962 | Cook | |
| 3,424,033 A | 1/1969 | Croswhite | |
| 4,250,984 A | 2/1981 | Hoyler et al. | |
| 4,645,049 A | 2/1987 | Matsuda et al. | |
| 4,732,253 A | 3/1988 | Hiramatsu et al. | |
| 4,741,422 A * | 5/1988 | Fuehrer et al. | 192/87.11 |
| 5,186,070 A | 2/1993 | Nitzschke et al. | |
| 5,720,375 A | 2/1998 | Maeda et al. | |
| 6,026,944 A | 2/2000 | Satou et al. | |
| 6,247,569 B1 | 6/2001 | McGuire | |
| 6,523,657 B1 | 2/2003 | Kundermann et al. | |
| 6,929,107 B2 * | 8/2005 | Hegerath | 192/87.11 |
| 2003/0085094 A1 | 5/2003 | Miyoshi et al. | |
| 2003/0116396 A1 | 6/2003 | Kuhstrebe | |
| 2006/0042904 A1 | 3/2006 | De Mazlere | |

FOREIGN PATENT DOCUMENTS

| | | |
|---|---|---|
| DE | 35 08 375 | 11/1985 |
| DE | 91 14 528 | 2/1992 |
| DE | 42 39 233 | 5/1994 |
| DE | 101 46 837 | 5/2002 |
| DE | 101 43 834 | 3/2003 |
| DE | 101 46 606 | 4/2003 |
| EP | 854304 | 7/1998 |
| EP | 1195537 | 4/2002 |
| EP | 1236936 | 9/2002 |
| EP | 1 482 195 A2 * | 12/2004 |
| GB | 14688 | 5/1916 |
| GB | 774824 | 5/1957 |
| JP | 60484721 | 9/1985 |
| JP | 10 089377 | 4/1998 |
| WO | 9015272 | 12/1990 |

OTHER PUBLICATIONS

European Search Report for co-pending application, 04020300.2.
Office Action of Related U.S. Appl. No. 11/212,472, filed May 11, 2007, 9 pages.

* cited by examiner

*Primary Examiner*—Rodney H. Bonck
(74) *Attorney, Agent, or Firm*—Sheridan Ross P.C.

(57) ABSTRACT

Hydraulic double clutch is provided that includes fluidically interconnected balancing chambers that are associated with a first and a second clutch piston.

6 Claims, 1 Drawing Sheet

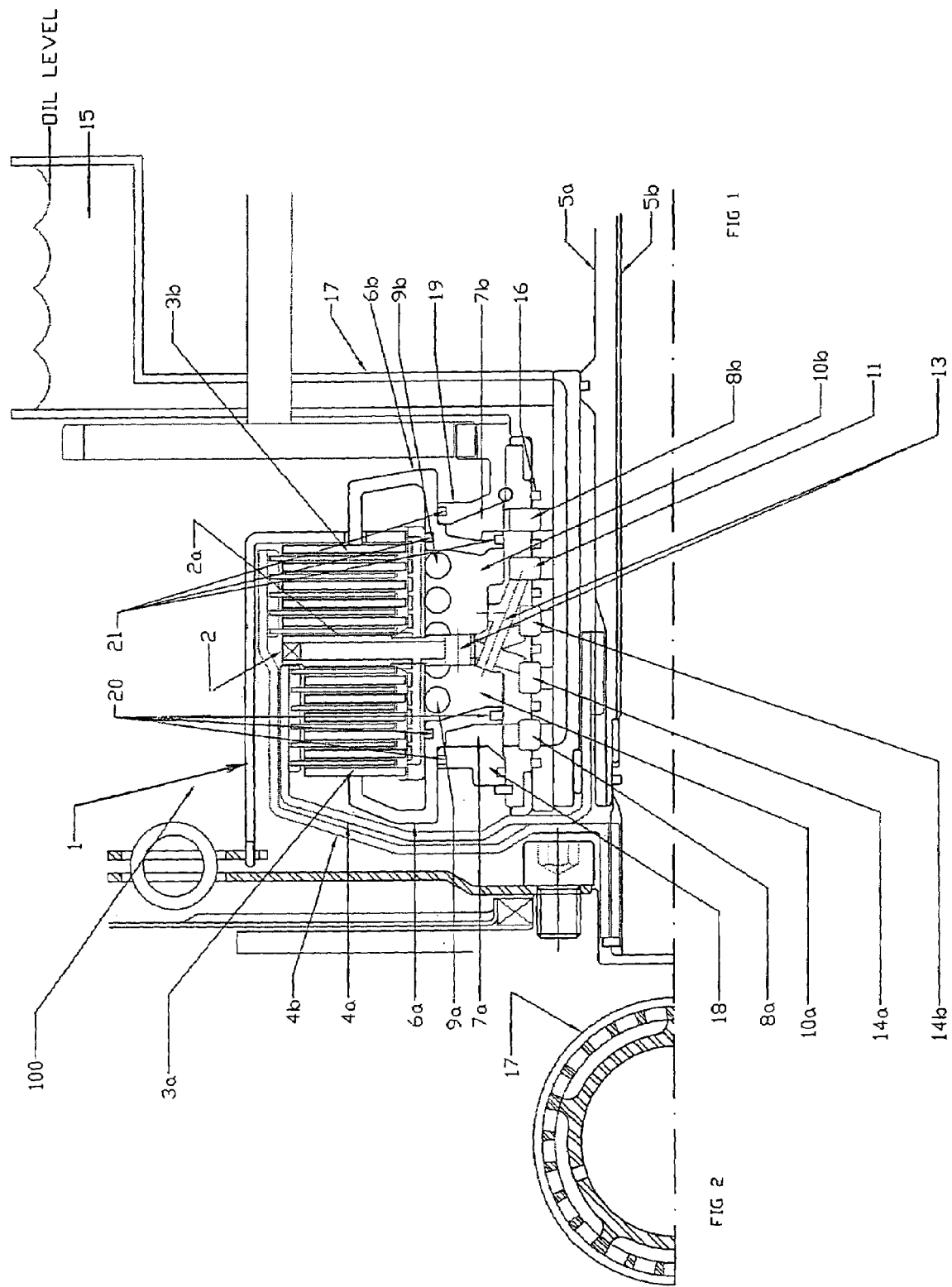

HYDRAULIC DOUBLE CLUTCH

The present invention concerns a hydraulic double clutch for a transmission of an engine, the transmission having an outer shaft and a concentrically arranged inner shaft.

Such a double clutch is known from EP 1 195 537 B1. With this known double clutch, the oil for the balancing chambers is taken from either the lubrication or from the clutch pressure so that four oil passages are provided. This clutch design, however, results in an inadequate balancing of the pistons. During a short time of clutch opening, the balancing chambers need a high oil flow since their volume is increasing and they must remain filled all the time in order to produce the required balancing force. If the balancing force is too low during clutch opening, the piston will not release the clutch completely when the activation pressure is put to zero. In this case the clutch will still transfer torque and the gear shift realized by synchronizers or dog clutches will be problematic. If the balancing chambers are fed from the lubrication oil, the lube flow must be high during clutch opening. On the other hand, the lube flow must be reduced to (almost) zero in order to diminish the dragging of the clutch during synchronizing. Although synchronizing happens theoretically after clutch opening, in practice both actions will overlap one another slightly in order to shorten the total time of the whole gear change process. These contradictory demands for the flow are thus inherent to a design with balancing oil taken from the lube flow.

If the balancing chambers are supplied with oil from the clutch activation room by an orifice, similar problems occur. During clutch opening a high flow in the balancing chambers is needed but at that moment the pressure in the clutch-activation chamber is draining away via a control valve. So, there is no pressure drop over the orifice and thus no flow from the clutch activation room to the balancing chamber can be expected. It can also be proven mathematically that, if perfect balancing or even overbalancing is chosen, the volume of the balancing room is bigger than the volume of the activation room.

Another double clutch is known from the EP-A-19833378 and DE 10146606 where the oil is passing twice over parts rotating with different speeds requiring more seals and larger diameters of the seals. More seals generate more friction and thus more fuel consumption of the car. Larger seals risk to overheat in cars with fast running engines.

It is, therefore an object underlying the present invention to provide a hydraulic double clutch for a transmission of an engine, the transmission having an outer shaft and a concentrically arranged inner shaft that is able to reduce the number and the diameter of the piston rings as far as possible to keep the mechanical friction and the cost low nevertheless providing adequate balancing performance.

According to the present invention the balancing chambers are fluidly connected to each other so that they functionally constitute a common balancing room for both clutch pistons. The clutch pistons rotate always with the same speed (both at engine speed) and they may have the same geometry, although different geometries with dynamic forces which are sufficiently equal to each other are also possible. The clutch pistons generate thus the same dynamic forces so that connected balancing-chambers forming one common balancing room for both clutch pistons are sufficient. This layout can practically be achieved by holes in the inner part of the central web of the double clutch according to the present invention so that the oil pressure at both sides is equal and that oil can flow freely from one side to the other. Unless a controlled static pressure is needed for specific reasons, normally, for balancing purposes only, the static supply pressure for the balancing chambers should be zero but the flow capacity should be high. This can be obtained easily and inexpensively by a cavity located in the stator above the inlet into the balancing chambers. This cavity is preferably continuously filled. An oil drain at a certain level may be added. The air above the oil level is preferably at atmospheric pressure so that the static pressure in the balancing chambers is created by the height of this balancing cavity above the inlet of the balancing chambers. For example 125 mm height creates about 0.01 bar. The balancing cavity acts as an accumulator at a constant low pressure.

The double clutch according to the present invention provides specific advantages as sealing rings are sealing the oil which is passing from the stationary stator to the rotating clutches. The sealing rings are critical parts because they must seal but not overheat due to the friction in the sliding surfaces. So, disposing said sealing rings at the smallest possible diameter of the piston cylinder units results in the advantage that the tangential speed is lower for the same angular speed. A lower tangential speed results in less heat and lower frictional torque.

Preferably the piston rings are disposed in line between the stator and the rotating clutches. Preferably the piston rings are disposed in grooves included in the stator.

Moreover, according to another preferred embodiment, each clutch piston is provided with a separate lubrication oil passage. This results in the advantage of the possibility to interrupt the lube flow to one clutch (the lube interruption is needed during synchronizing) while the lubrication to the other clutch is continued as the other clutch might be slipping or be in micro-slip so that it needs lubrication.

Further features and advantages of the present invention will become apparent from the following description of preferred embodiments with reference to the appended drawings, wherein FIG. 1 shows a schematically simplified view of the double clutch according to the present invention, and FIG. 2 shows a front view of the stator of the double clutch according to FIG. 1.

FIG. 1 shows a hydraulic double clutch 100 for a transmission of an engine that are both not shown in the drawings. However, an outer shaft 5a and a concentrically arranged inner shaft 5b of said transmission are shown in FIG. 1.

The double clutch 100, furthermore, includes a stationary stator 17 and a clutch housing having a drive can 1 driven by the engine.

Moreover, a first hydraulically activated clutch having a first clutch pack 3a is shown driving an inner drum 4a connected to the outer shaft 5a.

A second hydraulically activated clutch includes a second clutch pack 3b driving an outer drum 4b connected to the inner shaft 5b.

Moreover, a central hub 2 is provided that is connected to the clutch housing and comprises a web 2a separating the juxtaposed clutch packs 3a and 3b. Moreover, the hydraulic clutch 100 comprises a first piston-cylinder unit including a first clutch piston 6a that is activated by a first hydraulic activation chamber 7a. The activation chamber 7a is disposed between a first cylinder 18 and one side of the first clutch piston 6a that acts on the first clutch pack 3a.

Moreover, a second piston cylinder unit is provided including a second clutch piston 6b being activated by a second hydraulic activation chamber 7b. The second hydraulic activation chamber 7b is disposed between a second cylinder 19 and one side of the second clutch piston 6b acting on the second clutch pack 3b.

Finally, the double clutch according to the present invention includes a first balancing chamber 10a disposed on the other side of the first clutch piston 6a and a second balancing chamber 10b disposed on the other side of the second clutch piston 6b.

This design of the double clutch according to the present invention essentially corresponds to EP 1195537 B1 so that the entire disclosure of that reference is incorporated into the disclosure of the present application by explicit reference for the sake of completeness.

As can be seen especially from FIG. 1 the first and the second balancing chambers 10a, 10b are fluidly connected to each other via distribution holes 13. So, they form a common balancing room for both the first and the second clutch piston 6a and 6b, respectively.

Moreover, the connected balancing chambers 10a and 10b have an own oil supply from a balancing cavity 15. The cavity 15 is located in the stator 17 on a level above the inlet into the balancing chambers 10a and 10b.

Moreover, the double clutch 100 according to the present invention comprises sealing rings 16, in the shown embodiment in total six such sealing rings that are disposed inside the piston-cylinder units at the smallest possible diameter of said units. As is shown in FIG. 1, the six sealing rings are disposed in line next to each other with the sealing rings being represented by grooves in the stator 17 into which the rings are to be inserted.

Moreover, FIG. 1 shows that the clutch pistons 6a and 6b are biased by return springs 9a and 9b, respectively and that the stator 17 includes clutch pressure passages 8a and 8b for the two clutches as well as lubrication oil passages 14a and 14b and a separate balancing oil passage 11.

This design provides optimized balancing in connection with a disposition of the sealing rings at a very small diameter thus preventing the sealing rings from getting overheated and reducing the frictional torque to a minimum.

Finally, it is to be mentioned that the clutch pistons 6a and 6b are sealed by piston seals 20 and 21, respectively.

The double clutch 100 according to the before-explained design functions as follows:

The engine drives the drive can 1 which is connected to the central hub 2. The clutch pack 3a with the smallest outer diameter drives the inner drum 4a which is connected to the outer shaft 5a.

The other clutch pack 3b drives the outer drum 4b connected to the inner shaft 5b.

The clutch is closed when the pistons 6a and 6b are pushed against the clutch pack by pressurizing the activation chamber 7a and 7b respectively via the oil passage 8a and 8b for the clutch pressure.

The clutch opens when the activation chamber is put at zero static pressure because the return springs 9a and 9b, respectively, push the pistons 6a or 6b back. The balancing chambers 10a and 10b are filled with oil via the oil passage 11 for balancing oil. In this layout the pistons 6a and 6b are overbalanced since the outer diameter of the balancing chamber 10a or 10b is larger than the outer diameter of the activation chamber 7a or 7b. The distribution holes 13 in the central hub 2 distribute the balancing oil over the two balancing chambers 10a and 10b. The lubrication oil is supplied over the lubrication oil passages 14a and 14b to lubricate via internal channels the clutch packs 3a and 3b, respectively.

The lubrication inside the clutch is realized by channels inside the central hub 2. There is a separate set of channels for each clutch. These channels direct the lube into all distributors in the hubs and clutch packs (plates) 3a and 3b.

This way the oil is forced to pass through the plates. The oil channels rotate at engine speed and act thus as a centrifugal pump. With the channels completely filled with oil and without oil flow, the delivery head increases quadratic with the speed. In the lubrication supply line check valves (not shown) are mounted to allow air to be aspirated and being mixed with the lube oil in case a vacuum is generated by the pump effect. This situation may only occur at high engine speeds and low lube flow.

As the sealing rings 16 are all mounted inside the clutch it is possible to obtain a compact design and to avoid a complex interface with the transmission.

Moreover, preferably the plates in the outer drum can have a larger outer diameter than those in the inner drum so that their number can be reduced shortening the total length of the double clutch.

LIST OF REFERENCE SIGNS

1 Drive can
2 Central hub
2a Web
3a, 3b Clutch packs
4a Inner drum
4b Outer drum
5a Outer shaft
5b Inner shaft
6a First clutch piston
6b Second clutch piston
7a First activation chamber
7b Second activation chamber
8a, 8b Clutch pressure passages
9a, 9b Return springs
10a, 10b Balancing chambers
11 Oil passage
12 -
13 Distribution holes
14a, 14b Lubrication oil passages
15 Balancing cavity
16 Sealing rings
17 Stator
18 First cylinder
19 Second cylinder
20,21 Piston seals
100 Double clutch

The invention claimed is:

1. Hydraulic double clutch for a transmission of an engine, the transmission having an outer shaft and a concentrically arranged inner shaft comprising:
   a stationary stator;
   a clutch housing having a drive can driven by the engine;
   a first hydraulically activated clutch including a first clutch pack driving an inner drum connected to the outer shaft;
   a second hydraulically activated clutch including a second clutch pack driving an outer drum connected to the inner shaft;
   a central hub connected to the clutch housing and having a web separating the juxtaposed clutch packs;
   a first piston-cylinder unit including a first clutch piston being activated by a first hydraulic activation chamber disposed between a first cylinder and one side of the first clutch piston acting on the first clutch pack;
   a second piston-cylinder unit including a second clutch piston being activated by a second hydraulic activation chamber disposed between a second cylinder and one side of the second clutch piston acting on the second clutch pack;

balancing means including:
- a first balancing chamber disposed on the other side of the first clutch piston; and
- a second balancing chamber disposed on the other side of the second clutch piston;

wherein the first and the second balancing chambers are fluidly connected to each other by distribution holes in the central hub to form a common balancing room and to connect to a common balancing oil passage in the stator;

wherein the connected balancing chambers have an own oil supply from a balancing cavity located in the stator above an inlet into the balancing chambers; and wherein sealing rings are disposed between the stator and the piston cylinder units radially inside the piston-cylinder units at the smallest possible diameter thereof.

2. Hydraulic double clutch according to claim 1, wherein the sealing rings are disposed in line between the stator and the rotating clutches.

3. Hydraulic double clutch according to claim 2, wherein there are provided six sealing rings.

4. Hydraulic double clutch according to claim 1, wherein each clutch piston is provided with a separate lubrication oil passage.

5. Hydraulic double clutch according to claim 2, wherein each clutch piston is provided with a separate lubrication oil passage.

6. Hydraulic double clutch according to claim 3, wherein each clutch piston is provided with a separate lubrication oil passage.

* * * * *